US011868433B2

(12) United States Patent
Crabb et al.

(10) Patent No.: US 11,868,433 B2
(45) Date of Patent: Jan. 9, 2024

(54) TARGET OBJECT IDENTIFICATION FOR WASTE PROCESSING

(71) Applicant: Accenture Global Solutions Limited, Dublin (IE)

(72) Inventors: Sarah Crabb, Houston, TX (US); Narendra Anand, Houston, TX (US); Sai Gattu, Cypress, TX (US); Raquel Andrea Werner, Houston, TX (US); Alfredo Arvide, Missouri City, TX (US); Arijit Bhuyan, The Woodlands, TX (US); Gabriel Ernesto Gutierrez Anez, Katy, TX (US); Aparna Pranavi Kakarlapudi, Overland Park, KS (US)

(73) Assignee: Accenture Global Solutions Limited, Dublin (IE)

( * ) Notice: Subject to any disclaimer, the term of this patent is extended or adjusted under 35 U.S.C. 154(b) by 474 days.

(21) Appl. No.: 17/100,549

(22) Filed: Nov. 20, 2020

(65) Prior Publication Data

US 2022/0164599 A1 May 26, 2022

(51) Int. Cl.
*G06F 18/214* (2023.01)
*G06N 20/00* (2019.01)
(Continued)

(52) U.S. Cl.
CPC ............. *G06F 18/214* (2023.01); *G06F 3/14* (2013.01); *G06F 18/40* (2023.01); *G06N 20/00* (2019.01); *G06V 20/00* (2022.01)

(58) Field of Classification Search
CPC .......... G06F 18/214; G06F 3/14; G06F 18/40; G06N 20/00; G06V 20/00; G06V 10/764
See application file for complete search history.

(56) References Cited

U.S. PATENT DOCUMENTS 5,270,811 A * 12/1993 Ishibashi .......... G08B 13/19691
370/395.61
7,954,359 B1 * 6/2011 Paderewski .......... F42B 30/006
73/12.09

(Continued)

OTHER PUBLICATIONS

Ahmed et al., "Active Learning Based Federated Learning for Waste and Natural Disaster Image Classification," IEEE, Nov. 16, 2020, vol. 8, pp. 208518-208531, DOI: 10.1109/ACCESS.2020.3038676, [retrieved on Nov. 30, 2020].

(Continued)

*Primary Examiner* — Lewis G West
(74) *Attorney, Agent, or Firm* — Harrity & Harrity, LLP

(57) ABSTRACT

In some implementations, a target object identification system may train a machine learning model to identify a target object in a volume of solid waste. The target object identification system may receive, from at least one imaging device positioned in a waste processing facility, imaging data associated with a portion of a volume of solid waste. The target object identification system may identify, using the trained machine learning model and based at least in part on the imaging data, the target object, wherein the target object is disposed within the volume of solid waste. The target object identification system may provide, to a separator control assembly that controls a separator, an output associated with the target object, wherein the output is to facilitate removal of the target object from the volume of solid waste.

20 Claims, 6 Drawing Sheets

(51) Int. Cl.
*G06V 20/00* (2022.01)
*G06F 3/14* (2006.01)
*G06F 18/40* (2023.01)

(56) References Cited

U.S. PATENT DOCUMENTS

| | | | | |
|---|---|---|---|---|
| 2008/0092410 | A1* | 4/2008 | Layh | E02F 5/226 |
| | | | | 37/142.5 |
| 2010/0146691 | A1* | 6/2010 | Chan | E03D 5/105 |
| | | | | 4/313 |
| 2010/0208941 | A1* | 8/2010 | Broaddus | G08B 13/19645 |
| | | | | 382/103 |
| 2014/0379588 | A1* | 12/2014 | Gates | G06Q 10/0631 |
| | | | | 705/308 |
| 2015/0314440 | A1* | 11/2015 | Parker | B25J 9/1612 |
| | | | | 700/253 |
| 2017/0046845 | A1* | 2/2017 | Boyle | G06T 7/73 |
| 2018/0243800 | A1* | 8/2018 | Kumar | G06N 20/00 |
| 2018/0317875 | A1* | 11/2018 | Khayrullaev | A61B 5/7221 |
| 2019/0130560 | A1* | 5/2019 | Horowitz | G06F 18/41 |
| 2019/0180101 | A1* | 6/2019 | Li | G06N 3/08 |
| 2020/0034785 | A1* | 1/2020 | Romano | B65F 3/14 |
| 2020/0143334 | A1* | 5/2020 | Kayara | G06Q 10/087 |
| 2022/0023918 | A1* | 1/2022 | Kumar | B07C 5/34 |
| 2022/0161298 | A1* | 5/2022 | Kumar | B07C 5/342 |
| 2022/0355342 | A1* | 11/2022 | Kumar | B07C 5/34 |

OTHER PUBLICATIONS

Extended European Search Report for Application No. EP21209162, dated Apr. 22, 2022, 8 pages.
Rahman et al., "Intelligent waste management system using deep learning with IoT," Journal of King Saud University—Computer and Information Sciences, Sep. 5, 2020, pp. 1-16.

* cited by examiner

TARGET OBJECT IDENTIFICATION FOR WASTE PROCESSING

BACKGROUND

Waste processing systems may be designed to process solid waste (e.g., trash, refuse) in any number of different ways. In some waste processing systems, solid waste is buried in landfills. In some cases, recyclable materials may be separated from the solid waste prior to burial. In some cases, waste processing systems may include waste-to-energy systems that convert solid waste to energy. For example, a waste-to-energy system may include an incinerator configured to burn solid waste to generate heat that is used to drive one or more steam turbines to generate electricity.

SUMMARY

In some implementations, a method includes training a machine learning model, wherein training the machine learning model comprises receiving a plurality of images of a training object corresponding to a target object; receiving, via a user interface, an annotation associated with the training object; determining a plurality of characteristics of the training object; and associating, based at least in part on the annotation, the plurality of characteristics with an object class corresponding to the training object; receiving, from at least one imaging device positioned in a waste processing facility, imaging data associated with a portion of a volume of solid waste; identifying, using the trained machine learning model and based at least in part on the imaging data, the target object, wherein the target object is disposed within the volume of solid waste; and providing, to a separator control assembly that controls a separator, an output associated with the target object, wherein the output is to facilitate removal, by the separator, of the target object from the volume of solid waste.

In some implementations, a computing system includes one or more memories and one or more processors, communicatively coupled to the one or more memories, configured to: train a machine learning model based at least in part on a plurality of training images of a training object that corresponds to a target object; and implement the trained machine learning model in association with a waste processing system, wherein the one or more processors, when implementing the trained machine learning model, are configured to: receive, from at least one imaging device associated with the waste processing system, imaging data associated with a portion of a volume of solid waste; identify, using the trained machine learning model and based at least in part on the imaging data, the target object that is disposed within the volume of solid waste; and provide, to a separator control assembly that controls a separator, an output associated with the target object, wherein the output is to facilitate removal, by the separator, of the target object from the volume of solid waste.

In some implementations, a non-transitory computer-readable medium storing instructions includes one or more instructions that, when executed by one or more processors, cause the one or more processors to: receive imaging data associated with a portion of a volume of solid waste; identify, using a machine learning model and based at least in part on the imaging data, a target object that is disposed within the volume of solid waste; and provide an output associated with the target object, wherein the output is to facilitate removal of the target object from the volume of solid waste.

DETAILED DESCRIPTION

Figure 1A:
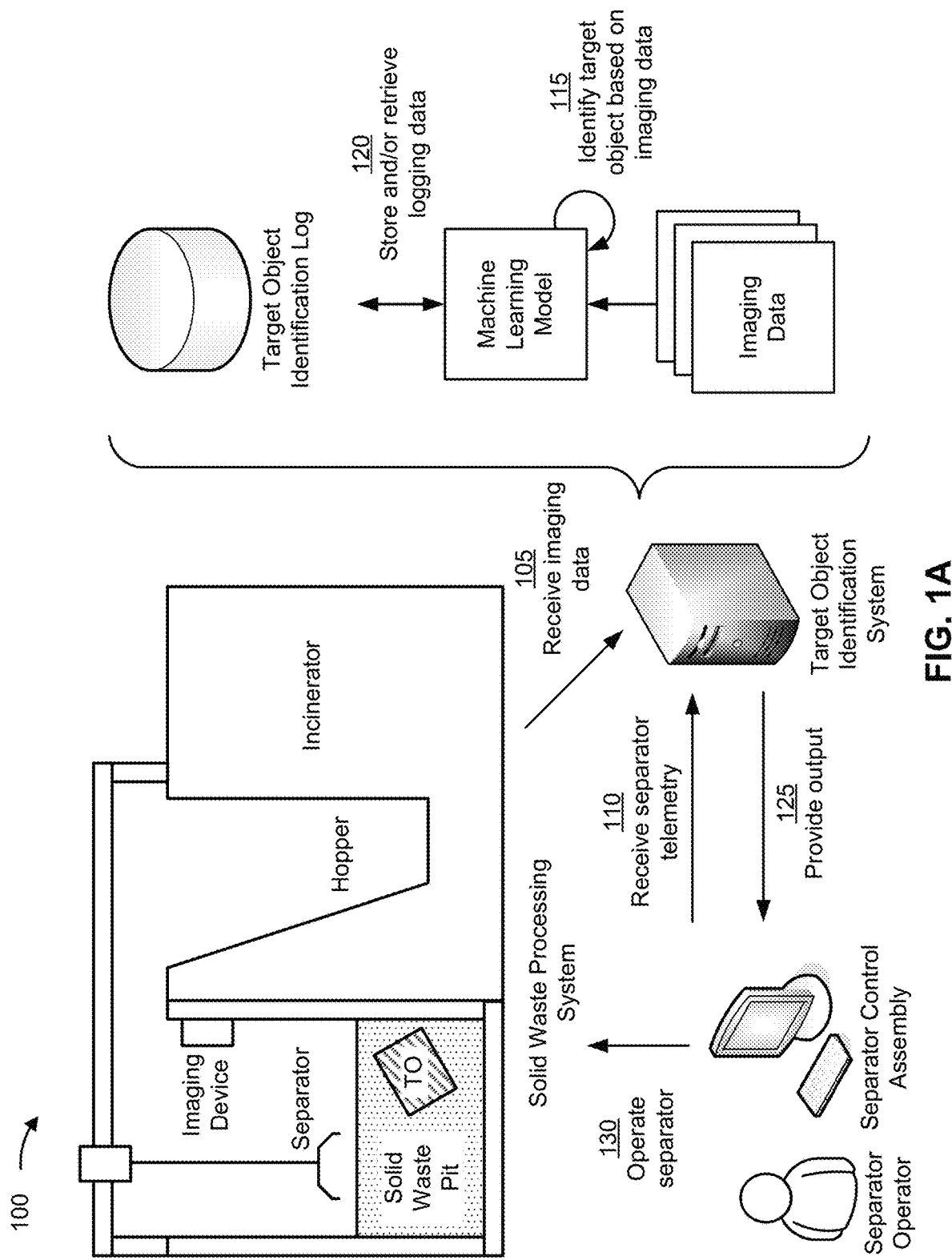
FIGS. 1A and 1B are diagrams of an example implementation described herein.

The following detailed description of example implementations refers to the accompanying drawings. The same reference numbers in different drawings may identify the same or similar elements.

In the waste-to-energy industry, large pits of solid waste may serve as a fuel source for one or more incinerators that burn the solid waste to produce heat for powering steam turbines that, in turn, produce energy. Some types of objects (referred to herein as "target objects") that are bulky or do not burn fast enough to maintain temperatures sufficient for driving the turbines may be disposed in a volume of solid waste. Bulky items can cause congestion in hoppers that feed the incinerators, which may result in system shutdowns to remove congestion. Inability to maintain certain temperatures may result in supplementing the incineration by burning natural gas. Accordingly, the presence of target objects in a volume of solid waste may result in inefficiencies of operation and/or increased costs, among other examples. In some cases, a crane operator monitors incoming solid waste and removes target objects using a separator (e.g., a crane, a bucket, a scoop, a screen). However, target objects may be difficult for a crane operator to identify within a volume of solid waste. Additionally, in some cases, separator operation may be automated.

Some implementations described herein enable identification of target objects in a volume of solid waste. A target object may include any object and/or type of object that is identifiable using a target object identification system. For example, a target object may include a bulky item, which may be an item that is large and/or unwieldly enough to interrupt or otherwise attenuate a waste processing procedure. For example, in some implementations, a bulky item may be an item (e.g., a mattress, a desk, among other examples) that is determined to be likely to clog an incinerator hopper. In some examples, a target object may include an object that may not burn fast enough in an incinerator to maintain a particular temperature (e.g., a tree stump, a piece of wood furniture, among other examples), among other examples.

Implementations of the subject matter described herein include positioning one or more imaging devices within a solid waste processing facility. The one or more imaging devices may provide imaging data to a machine learning model (e.g., a neural network) that may be trained to identify, based at least in part on the imaging data, target objects within a volume of solid waste. The machine learning model may provide an output that may be used to provide a visual representation of an identified target object on a user interface of a separator control assembly to facilitate the separator operator removing the target object using the separator. In some aspects, the output may include an instruction that causes an automated separator to remove the target object from the volume of solid waste.

As a result, target objects may be more readily identified in solid waste so that the target objects may be removed from the solid waste. For example, target objects may be removed from a solid waste pit so that, when waste is extracted from the pit to be placed into an incinerator hopper, the target objects are not placed into the incinerator hopper. In this way, various aspects of implementations described herein may facilitate avoiding shut-downs to remove target objects from incinerator hoppers, increase monetary and resource efficiency by reducing the incidence of using supplementary natural gas fuel for fueling an incinerator, and/or increase efficiency of identification and/or location of target objects, among other examples.

Figure 1B:
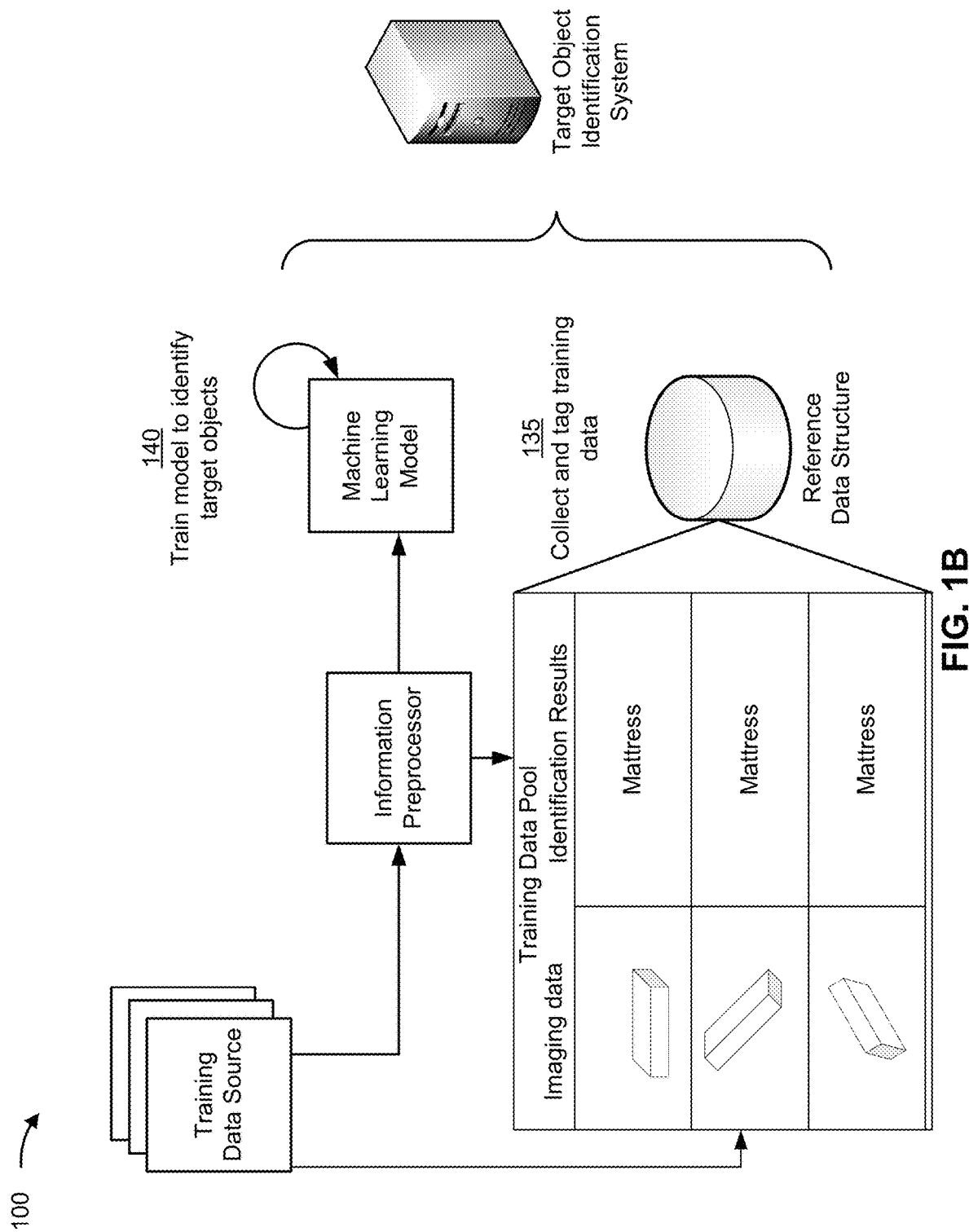

FIGS. 1A and 1B are diagrams of an example implementation 100 associated with target object identification for waste processing. As shown in FIGS. 1A and 1B, example implementation 100 includes a solid waste processing system, a target object identification system, and a separator control assembly. These devices are described in more detail below and in connection with FIG. 3 and FIG. 4.

As shown in FIG. 1A, for example, the solid waste processing system may include an incinerator that is used to incinerate solid waste. Heat generated from incineration of the solid waste may be used to drive one or more steam turbines (not shown) that are configured to produce electricity. Solid waste may be fed into the incinerator by way of a hopper (which may be referred to as an "incinerator hopper"). A separator may be used to extract solid waste from a solid waste pit and deliver the extracted solid waste to the hopper. The separator may include any number of different types of separating devices such as, for example, a crane, a bucket, a scoop, a screen, and/or a mechanical arm, among other examples. The separator control assembly may be configured to control one or more aspects of operation of the separator. The separator control assembly may be configured to facilitate operation of the separator by a separator operator and/or by automation. The separator control assembly may include one or more computing devices, one or more input/output devices configured to present one or more user interfaces, and/or one or more actuators configured to cause actuation of one or more aspects of the separator.

As shown by reference number 105, in operation, the target object identification system may receive imaging data. The imaging data may be provided to the target object identification system by one or more imaging devices associated with the solid waste processing system. An imaging device may include a digital camera, a video camera, a light detection and ranging (LIDAR) device, an x-ray imaging device, and/or the like. The one or more imaging devices may be positioned in any number of different locations in a waste processing facility in which the solid waste processing system is implemented. For example, one or more imaging devices may be positioned in, around, near, above, and/or below a solid waste pit, an incinerator hopper, and/or any other location associated with a waste processing facility.

As shown by reference number 110, the target object identification system may additionally, or alternatively, receive separator telemetry. Separator telemetry may include any type of data associated with a position, state, motion, or operation of the separator. For example, in the case in which the separator is a crane (as illustrated in the example), separator telemetry may include data representing a position of the separator, a motion of the separator, a weight of an object being held by the separator, and/or a resistance force applied against the separator, among other examples.

As shown by reference number 115, the target object identification system may utilize a machine learning model to identify a target object (shown as "TO") based at least in part on the imaging data and/or the separator telemetry. The machine learning model may include one or more neural networks trained to recognize one or more target objects, target object types, and/or target object locations based at least in part on the imaging data. The machine learning component may generate one or more outputs. For example, one output may include logging data.

As shown by reference number 120, the target object identification system may be configured to store logging data in a target object identification log stored in a memory. Logging data may include data associated with an identification of a target object and may include data representing an indication of the identification, a location of the identified target object, one or more characteristics of the identified target object, and/or any number of other types of data. In some implementations, the target object identification system may be configured to retrieve stored logging data to provide to the machine learning model as input and/or to assist with training the machine learning model.

In some implementations, an output provided by the machine learning model may be configured to facilitate removal of the identified target object from the volume of solid waste. As shown by reference number 125, the target object identification system may provide an output to the separator control assembly. As shown by reference number 130, the separator control assembly may operate the separator to remove the target object.

In some implementations, for example, the output may include a display instruction configured to cause a display device of the separator control assembly to display a representation of the target object. For example, the display device of the separator control assembly may be configured to present a user interface that includes a representation (e.g., a live video feed, a snapshot photograph, and/or a digitally-generated graphical representation) of the solid waste pit. The output may include a display instruction configured to cause the user interface to present a bounding box around the relative location of the identified target object on the representation of the solid waste pit. In some implementations, the display instruction may cause the user interface to present a graphical representation of the identified target object, which may be rendered in a manner configured to distinguish the representation of the identified target object from surrounding waste and/or objects (e.g., by using a different color, line weight, shading, and/or other distinguishing characteristic). In this way, the separator operator may locate the target object based on the displayed representation and may control the separator to remove the target object from the solid waste.

In some implementations, an output provided by the machine learning model may include an actuation instruction configured to cause the separator to remove the target object from the volume of solid waste. In some implementations, the separator may be automated or semi-automated, and the output may include executable instructions and/or data associated with a removal operation. For example, the output may include a set of coordinates that may be processed by the separator control assembly and used to direct the separator to the corresponding location within the solid waste pit to cause the separator to remove the target object from the solid waste.

FIG. 1B depicts aspects of a training process for training the machine learning model, in accordance with various implementations. As shown by reference number 135, the target object identification system may collect and tag training data. Training data may be collected from one or more training data sources. A training data source may include any device, data structure, and/or input that includes and/or can provide training data for training the machine learning model. For example, a training data source may include the target object identification log shown in FIG. 1A, the one or more imaging devices associated with the solid waste processing system, the separator control assembly, the Internet, a digital library, and/or other examples.

As shown in FIG. 1B, training data may be preprocessed using an information preprocessor. The information preprocessor may include a computing device, a user input device, and/or an operator. The information preprocessor may be configured to extract features based on the training data, generate a list of target objects, establish training paradigms, filter noise from training imaging data, and/or any number of other preprocessing steps. As shown, the target object identification system may maintain the collected training data within a reference data structure. The training data may be labeled by an operator and/or an aspect of the target object identification system. As shown, for example, the training data may include a training data pool that includes a number of sets of imaging data representing images of the target object (in this example, a mattress) from different angles. Each representation of the target object may be labeled with a name for the target object (in this case, "mattress").

As shown by reference number 140, the target object identification system may be configured to train the machine learning model to identify target objects. The target object identification system may train the machine learning model based at least in part on the training data that is collected and labeled. In some aspects, the target object identification system may employ supervised learning and/or unsupervised learning.

In some implementations, for example, a list of target objects may be generated, and training data (e.g., video imaging data) may be located and collected. The images may be tagged, in some implementations, manually, by receiving an annotation associated with a training object. For example, an operator may use a user interface to draw bounding boxes around training objects represented in the images. A training object is an object used for training that includes a same object type as a target object (e.g., an actual, specific mattress).

To facilitate accurate training, preprocessing may include ensuring enough varied images of a same type of a target object. As an example, a first training image of a plurality of training images may correspond to a first imaging angle with respect to a training object, and a second training image of the plurality of training images may correspond to a second, different, imaging angle. As another example, a first training image of a plurality of training images may correspond to a first lighting condition with respect to the training object, and a second training image of the plurality of training images may correspond to a second, different, lighting condition with respect to the training object. As another example, and as shown, a first training image of the plurality of training images may correspond to a first instance of the training object and a second training image of the plurality of training images may correspond to a second instance of the training object. Multiple "instances" of a training object may refer to multiple examples of a training object. For example, a training object type may be a mattress, and a first image of a first mattress may be referred to as a first instance of the training object type, while a second image of a second, different, mattress may be referred to as a second instance of the training object type.

In some implementations, tagging training data may involve noting a time and general location when an operator identifies a target object. The operator may use the separator to stage the target object for a number of images by moving the target object into different locations within the solid waste pit, rotating the target object in one or more directions, and/or dropping the target object from different heights so that when the target object lands, it becomes at least partially submerged within the solid waste, among other examples.

In some implementations, to increase the number of images, the information preprocessor may perform image augmentation on a set of images by digitally modifying each image a number of different ways to provide even more variety for the neural network training. These digital modifications may include but are not limited to changing brightness of the image, rotating/mirroring/flipping the image, adding "noise" to the image, removing arbitrary chunks of the image, stretching/warping the image, and/or performing any number of other digital alterations to the image. The training data sources also may include separator telemetry data that is obtained using one or more sensors installed on the separator. In some implementations, LIDAR may be used for generating training data as well.

Implementations of the subject matter described above may facilitate readily identifying target objects in solid waste so that the target objects may be removed. In this way, various aspects of implementations described herein may facilitate avoiding shut-downs to remove target objects from incinerator hoppers, increase monetary and resource efficiency by reducing the incidence of using supplementary natural gas fuel for fueling an incinerator, and/or increase efficiency of identification and/or location of target objects, among other examples.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
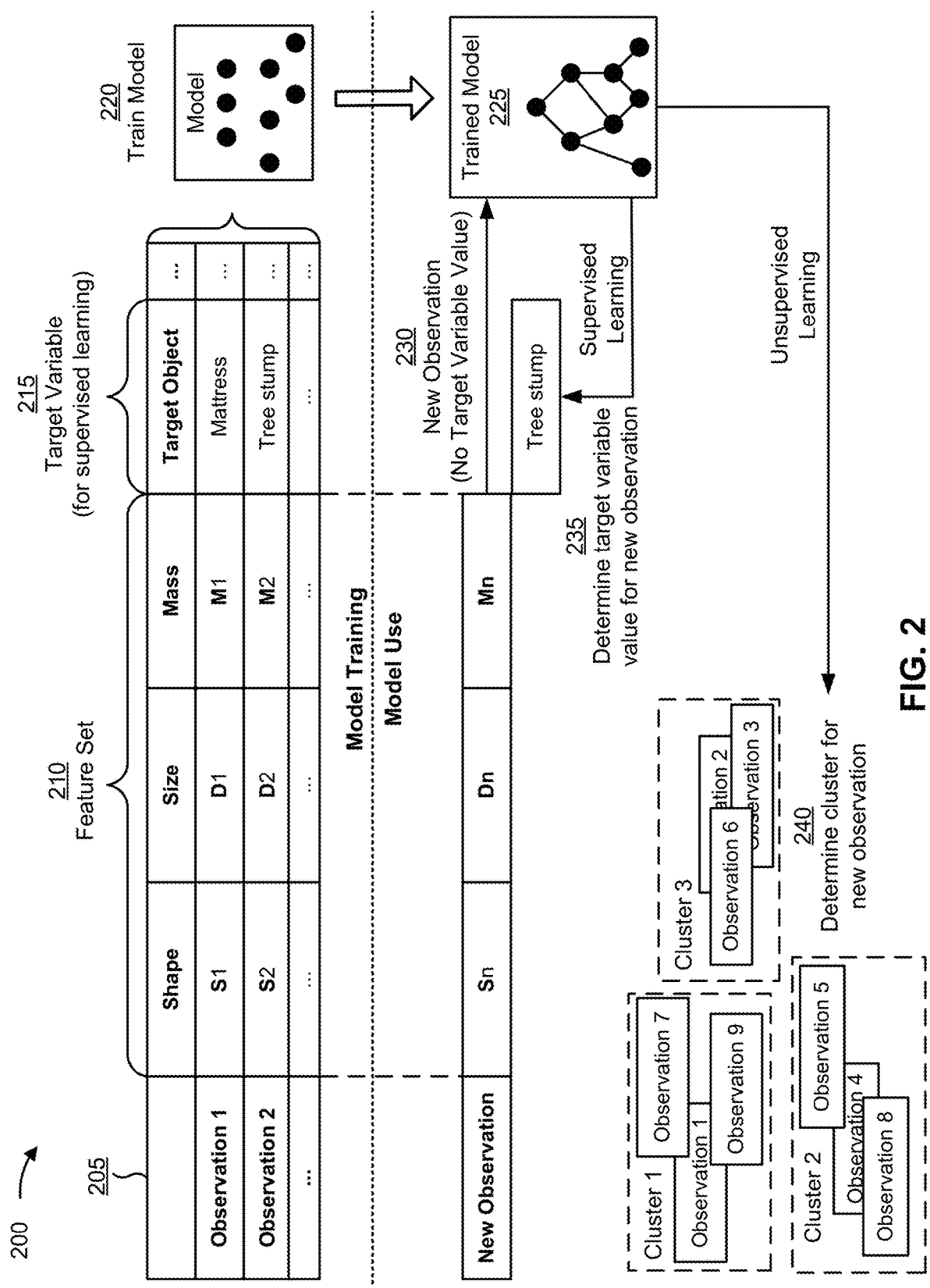
FIG. 2 is a diagram of an example machine learning process described herein.

FIG. 2 is a diagram illustrating an example 200 of training and using a machine learning model in connection with target object identification for waste processing. The machine learning model training and usage described herein may be performed using a machine learning system. The machine learning system may include or may be included in a computing device, a server, a cloud computing environment, or the like, such as the target object identification system 301, cloud computing system 302, client device 330, and/or training data source 340, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from one or more training data sources, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the training data sources. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of shape, a second feature of size, a third feature of mass, and so on. As shown, for a first observation, the first feature may have a value of vector S1, the second feature may have a value of D1, the third feature may have a value of M1, and so on. These features and feature values are provided as examples, and may differ in other examples. For example, the feature set may include one or more of the following features: pixels, pixel energy, color (per pixel or pixel block), color saturation, sharpness, contrast, object color, density, hardness, location, motion, and/or symmetry, among other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a target object identifier, which has a value of Mattress for the first observation. The target object identifier may be represented using a numerical value, a probability, a range of values, a qualitative value (e.g., as shown), and/or a combination of values. The target variable indicates the identified target object.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of shape, a second feature of size, a third feature of mass, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of tree stump for the target variable of identified target object for the new observation, as shown by reference number 235. Based on this prediction, the machine learning system may provide a first recommendation, may provide output for facilitating removal of the target object using a separator, may perform a first automated action, and/or may cause a first automated action to be performed (e.g., by instructing another device to perform the automated action), among other examples. The first automated action may include, for example, removal of the targeted object by an automated separator.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., bulky objects), then the machine learning system may provide a first recommendation, such as a recommendation associated with a location for depositing the target object after it has been removed from the solid waste. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., slow burning objects), then the machine learning system may provide a second (e.g., different) recommendation (e.g., a recommendation to deposit the removed target object in a different location) and/or may perform or cause performance of a second (e.g., different) automated action, such as depositing the removed target object in a different location.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to identify target objects. The machine learning system enables recognition and/or identification of tens, hundreds, thousands, or millions of features and/or feature values for tens, hundreds, thousands, or millions of observations, thereby increasing accuracy and consistency and reducing delay associated with identifying target objects relative to requiring computing resources to be allocated for tens, hundreds, or thousands of operators to manually identify target objects using the features or feature values.

As indicated above, FIG. 2 is provided as an example. Other examples may differ from what is described in connection with FIG. 2.

Figure 3:
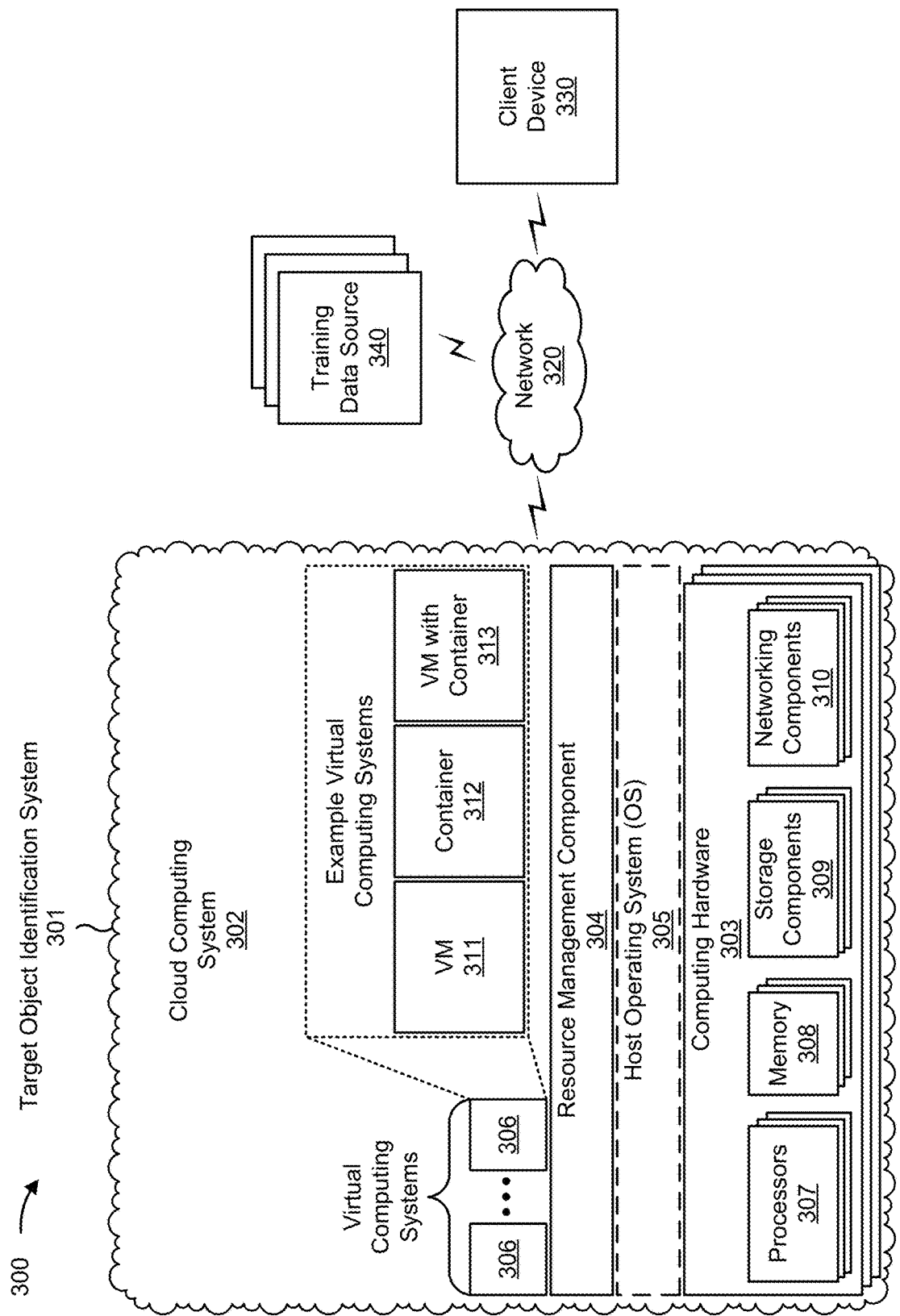
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a target object identification system 301, which may include one or more elements of and/or may execute within a cloud computing system 302. The cloud computing system 302 may include one or more elements 303-313, as described in more detail below. As further shown in FIG. 3, environment 300 may include a network 320, a client device 330 (e.g., a separator control assembly, a remote control device for one or more aspects of a waste processing system), and/or a training data source 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the target object identification system 301 may include one or more elements 303-313 of the cloud computing system 302, may execute within the cloud computing system 302, and/or may be hosted within the cloud computing system 302, in some implementations, the target object identification system 301 may not be cloud-based (e.g., may be implemented outside of a cloud computing system) or may be partially cloud-based. For example, the target object identification system 301 may include one or more devices that are not part of the cloud computing system 302, such as device 400 of FIG. 4, which may include a standalone server or another type of computing device. The target object identification system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The client device 330 may include a separator control assembly (or one or more aspects thereof), a control device associated with a waste processing system, and/or a monitoring device. The training data source 340 may include a separator control assembly, one or more sensors associated with the separator and/or another aspect of a waste processing system, an input device that may receive a user input, a computing device having a data store, an imaging device, and/or a separator telemetry device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
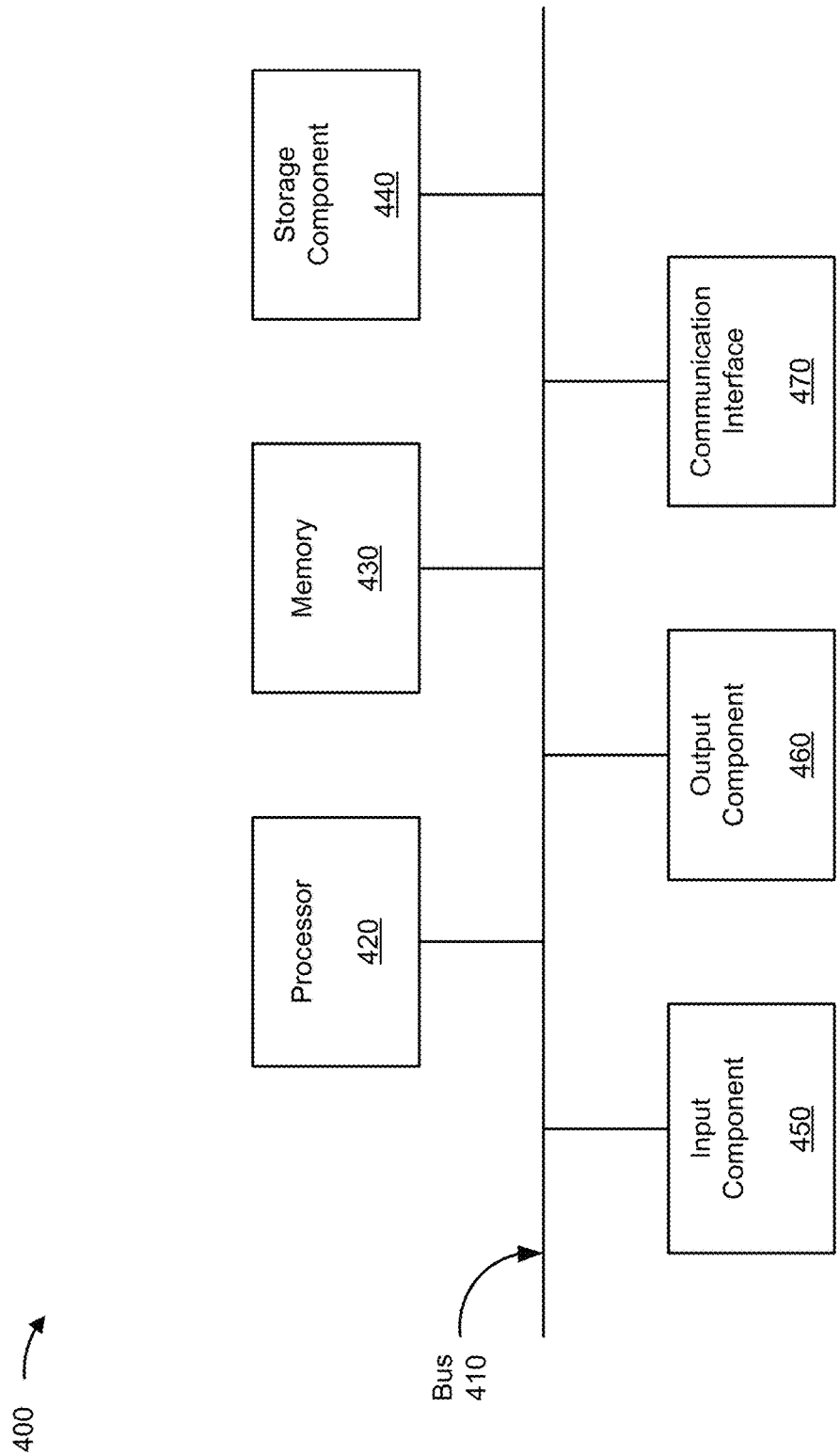
FIG. 4 is a diagram of example components of one or more devices of FIG. 3.

FIG. 4 is a diagram of example components of a device 400, which may correspond to a target object identification system, a separator control assembly, and/or a solid waste processing system. In some implementations, target object identification system, a separator control assembly, and/or a solid waste processing system may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
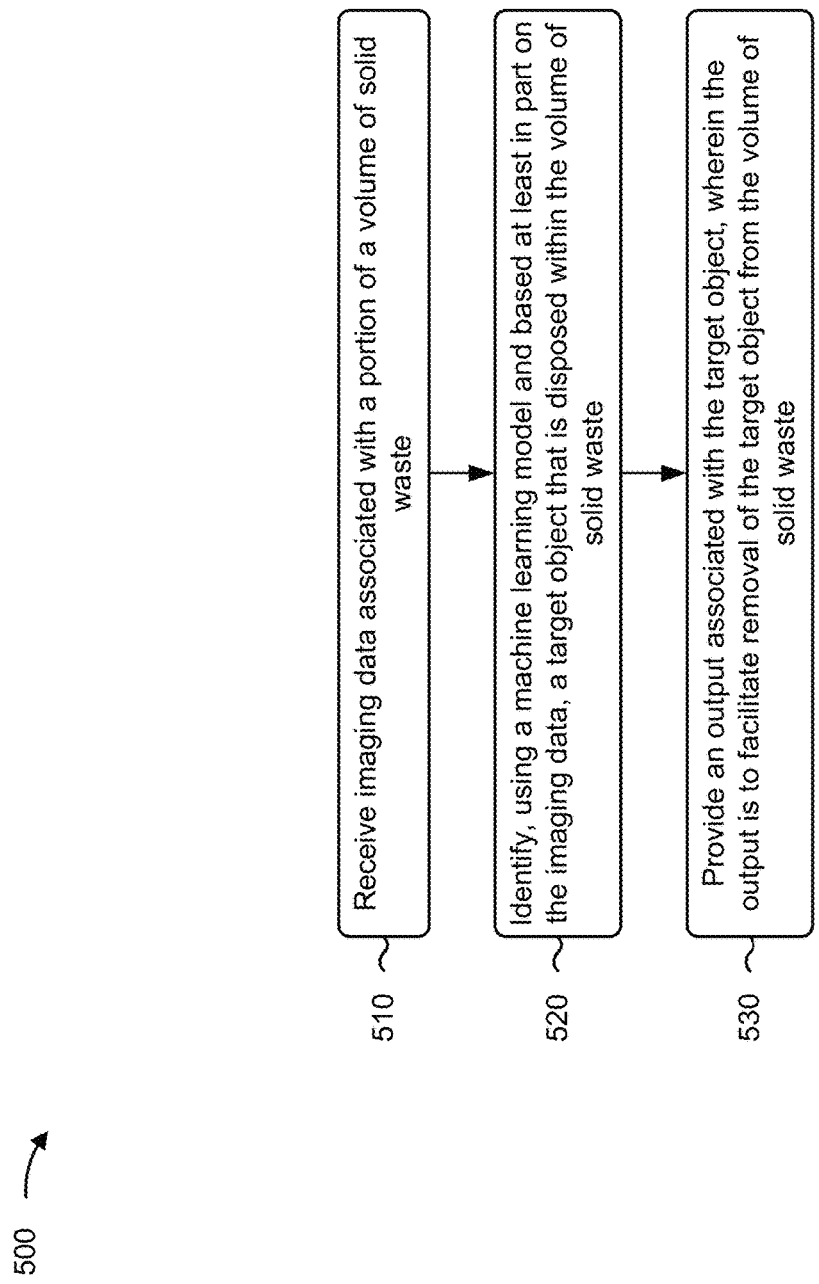
FIG. 5 is a flowchart of an example process relating to target object identification for waste processing.

FIG. 5 is a flowchart of an example process 500 associated with target object identification for waste processing. In some implementations, one or more process blocks of FIG. 5 may be performed by a target object identification system (e.g., target object identification system 301). In some implementations, one or more process blocks of FIG. 5 may be performed by another device or a group of devices separate from or including the target object identification system, such as a client device (e.g., client device 330), and/or a training data source (e.g., training data source 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving imaging data associated with a portion of a volume of solid waste (block 510). For example, the target object identification system may receive imaging data associated with a portion of a volume of solid waste, as described above.

As further shown in FIG. 5, process 500 may include identifying, using a machine learning model and based at least in part on the imaging data, a target object that is disposed within the volume of solid waste (block 520). For example, the target object identification system may identify, using a machine learning model and based at least in part on the imaging data, a target object that is disposed within the volume of solid waste, as described above.

As further shown in FIG. 5, process 500 may include providing an output associated with the target object, wherein the output is to facilitate removal of the target object from the volume of solid waste (block 530). For example, the target object identification system may provide an output associated with the target object, wherein the output is to facilitate removal of the target object from the volume of solid waste, as described above.

Process 500 may include additional implementations, such as any single implementation or any combination of implementations described below and/or in connection with one or more other processes described elsewhere herein.

In a first implementation, the output comprises at least one of a display instruction to cause a display device of a crane control assembly to display a representation of the target object, an actuation instruction to cause the crane to remove the target object from the volume of solid waste, or logging data to be stored in a target object identification log maintained on a memory device.

In a second implementation, alone or in combination with the first implementation, the machine learning model comprises at least one neural network.

In a third implementation, alone or in combination with one or more of the first and second implementations, the method may include training the machine learning model.

In a fourth implementation, alone or in combination with one or more of the first through third implementations, process 500 includes receiving a plurality of images of a training object corresponding to the target object, receiving, via a user interface, an annotation associated with the training object, determining a plurality of characteristics of the training object, and associating, based at least in part on the annotation, the plurality of characteristics with an object class corresponding to the training object.

In a fifth implementation, alone or in combination with one or more of the first through fourth implementations, the method may include receiving the imagining data from at least one imaging device, the at least one imaging device comprising at least one of a digital camera, a video camera, or a LIDAR device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    training a machine learning model, wherein training the machine learning model comprises:
        receiving a plurality of images of a training object corresponding to a target object;
        receiving, via a user interface, an annotation associated with the training object;
        determining a plurality of characteristics of the training object; and
        associating, based at least in part on the annotation, the plurality of characteristics with an object class corresponding to the training object;
    receiving, from at least one imaging device positioned in a waste processing facility, imaging data associated with a portion of a volume of solid waste;
    receiving, from a separator control assembly that controls an operation of a separator, telemetry data indicating one or more of a weight of an object being held by the separator or a resistance force applied against the separator;
    identifying, using the trained machine learning model and based at least in part on the imaging data and the telemetry data, the target object, wherein the target object is disposed within the volume of solid waste; and
    providing, to the separator control assembly, an output associated with the target object,
        wherein the output is to facilitate removal, by the separator, of the target object from the volume of solid waste, and
        wherein the output includes a display instruction to cause a display device of the separator control assembly to display a representation of the target object within, and distinguished from, the volume of solid waste.

2. The method of claim 1, wherein the display instruction is configured to cause the display device of the separator control assembly to display one or more of:
    the representation of the target object within a bounding box,
    the representation of the target object using a color that distinguishes the representation of the target object from other portions of the volume of solid waste,
    the representation of the target object using a line weight that distinguishes the representation of the target object from other portions of the volume of solid waste, or
    the representation of the target object using a shading that distinguishes the representation of the target object from other portions of the volume of solid waste.

3. The method of claim 1, wherein the output comprises an actuation instruction to cause the separator to remove the target object from the volume of solid waste.

4. The method of claim 1, wherein the output comprises logging data, the method further comprising storing the logging data in a target object identification log maintained on a memory device.

5. The method of claim 1, wherein the at least one imaging device comprises a light detection and ranging device.

6. The method of claim 1, wherein the at least one imaging device is positioned in association with at least one of:
    a solid waste pit, or
    a solid waste hopper.

7. The method of claim 1, further comprising receiving telemetry data associated with the separator, wherein the telemetry data includes data associated with one or more of: a position of the separator, a state of the separator, a motion of the separator, or an operation of the separator, and wherein identifying the target object further comprises:
identifying the target object based at least in part on the telemetry data.

8. The method of claim 1, wherein the machine learning model comprises at least one neural network.

9. A computing system, comprising:
one or more memories; and
one or more processors, communicatively coupled to the one or more memories, configured to:
train a machine learning model based at least in part on a plurality of training images of a training object that corresponds to a target object; and
implement the trained machine learning model in association with a waste processing system, wherein the one or more processors, when implementing the trained machine learning model, are configured to:
receive, from at least one imaging device associated with the waste processing system, imaging data associated with a portion of a volume of solid waste;
receive, from a separator control assembly that controls an operation of a separator, telemetry data indicating one or more of a weight of an object being held by the separator or a resistance force applied against the separator;
identify, using the trained machine learning model and based at least in part on the imaging data and the telemetry data, the target object that is disposed within the volume of solid waste; and
provide, to the separator control assembly, an output associated with the target object,
wherein the output is to facilitate removal, by the separator, of the target object from the volume of solid waste, and
wherein the output includes a display instruction to cause a display device of the separator control assembly to display a representation of the target object within, and distinguished from, the volume of solid waste.

10. The computing system of claim 9, wherein a first training image of the plurality of training images corresponds to a first imaging angle with respect to the training object, and a second training image of the plurality of training images corresponds to a second imaging angle with respect to the training object, and wherein the second imaging angle is different than the first imaging angle.

11. The computing system of claim 9, wherein a first training image of the plurality of training images corresponds to a first lighting condition with respect to the training object, and a second training image of the plurality of training images corresponds to a second lighting condition with respect to the training object, and wherein the second lighting condition is different than the first lighting condition.

12. The computing system of claim 9, wherein a first training image of the plurality of training images corresponds to a first instance of a training object type, and wherein a second training image of the plurality of training images corresponds to a second instance of the training object type.

13. The computing system of claim 9, wherein the output comprises at least one of:

an actuation instruction to cause the separator to remove the target object from the volume of solid waste, or logging data to be stored in a target object identification log maintained in a memory device.

14. The computing system of claim 9, wherein the machine learning model comprises at least one neural network.

15. A non-transitory computer-readable medium storing instructions, the instructions comprising:
one or more instructions that, when executed by one or more processors, cause the one or more processors to:
receive imaging data associated with a portion of a volume of solid waste;
receive, from a separator control assembly that controls an operation of a separator, telemetry data indicating one or more of a weight of an object being held by the separator or a resistance force applied against the separator;
identify, using a machine learning model and based at least in part on the imaging data and the telemetry data, a target object that is disposed within the volume of solid waste; and
provide an output associated with the target object,
wherein the output is to facilitate removal of the target object from the volume of solid waste, and
wherein the output includes a display instruction to cause a display device of the separator control assembly to display a representation of the target object within, and distinguished from, the volume of solid waste.

16. The non-transitory computer-readable medium of claim 15, wherein the separator comprises a crane, and wherein the output further comprises:
an actuation instruction to cause the crane to remove the target object from the volume of solid waste.

17. The non-transitory computer-readable medium of claim 15, wherein the machine learning model comprises at least one neural network.

18. The non-transitory computer-readable medium of claim 15, wherein the one or more instructions further cause the one or more processors to train the machine learning model.

19. The non-transitory computer-readable medium of claim 18, wherein the one or more instructions, that cause the one or more processors to train the machine learning model, cause the one or more processors to:
receive a plurality of images of a training object corresponding to the target object;
receive, via a user interface, an annotation associated with the training object;
determine a plurality of characteristics of the training object; and
associate, based at least in part on the annotation, the plurality of characteristics with an object class corresponding to the training object.

20. The non-transitory computer-readable medium of claim 15, wherein the one or more instructions, that cause the one or more processors to receive the imaging data, cause the one or more processors to receive the imaging data from a light detection and ranging device.

* * * * *